(12) United States Patent
Johnson et al.

(10) Patent No.: US 7,633,864 B2
(45) Date of Patent: Dec. 15, 2009

(54) METHOD AND SYSTEM FOR CREATING A DEMILITARIZED ZONE USING NETWORK STACK INSTANCES

(75) Inventors: Darrin P. Johnson, Mountain View, CA (US); Darren J. Reed, Mountain View, CA (US); Erik Nordmark, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 398 days.

(21) Appl. No.: 11/642,427

(22) Filed: Dec. 20, 2006

(65) Prior Publication Data
US 2008/0155676 A1    Jun. 26, 2008

(51) Int. Cl.
| | |
|---|---|
| H04L 12/26 | (2006.01) |
| H04L 12/28 | (2006.01) |
| H04L 12/56 | (2006.01) |
| H04J 3/16 | (2006.01) |
| G06F 15/16 | (2006.01) |
| G06F 15/173 | (2006.01) |

(52) U.S. Cl. .................. 370/230; 370/409; 370/419; 370/469; 709/230; 709/238; 709/250; 726/13
(58) Field of Classification Search .......... 370/389, 370/392, 419, 230, 409, 469; 709/230, 238, 709/250; 726/13
See application file for complete search history.

(56) References Cited

U.S. PATENT DOCUMENTS 7,478,173 B1    1/2009    Delco

2002/0169884 A1*  11/2002  Jean et al. ............... 709/230
2003/0065676 A1*  4/2003   Gbadegesin et al. ...... 707/104.1
2004/0267866 A1*  12/2004  Carollo et al. ............ 709/200

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).
Tripathi, S.; "CrossBow: Solaris Network Virtualization and Resource Control"; Crossbow Architectual Document, Nov. 21, 2006; 19 pages.
Nordmark, E. et al. ; "IP Instances Interface Document"; PSARC 2006/366, Dec. 28, 2006; 17 pages.
Nordmark, E.; "IP Instances Design Document"; PSARC 2006/366, Dec. 21, 2006; 38 pages.

(Continued)

*Primary Examiner*—Alpus H Hsu
*Assistant Examiner*—Saad Hassan
(74) *Attorney, Agent, or Firm*—Osha • Liang LLP (57) ABSTRACT

A method for routing a packet. The method includes receiving the packet from a first network into a network interface card (NIC), where the NIC is operatively connected to a host and the host includes a first virtual network stack and a second virtual network stack. The method further includes sending the packet to a first virtual network stack, where the first virtual network stack includes a first filter, a first network layer, and a first transport layer. In addition, the first filter, the first network layer, and the first transport layer are isolated from the second virtual network stack. If the packet is permitted through the first filter in the first virtual network stack, then the packet is sent to a first virtual NIC.

20 Claims, 6 Drawing Sheets

OTHER PUBLICATIONS

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zone"; presented at the SVOSUG meeting, Oct. 26, 2006; 28 pages.

Tripathi, S.; "CrossBow: Network Virtualization and Resource Control"; Presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

* cited by examiner

METHOD AND SYSTEM FOR CREATING A DEMILITARIZED ZONE USING NETWORK STACK INSTANCES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. Pat. No. 7,472,689; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. Pat. No. 7,499,457; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

The present application contains subject matter that may be related to the subject matter in the following U.S. application filed on Nov. 28, 2006, and assigned to the assignee of the present application: "Virtual Network Testing and Deployment using Network Stack Instances and Containers" with U.S. application Ser. No. 11/605,114.

BACKGROUND

Network traffic is transmitted over a network, such as the Internet, from a sending computer system, via a first network interface card (NIC), to a receiving computer system via a second NIC. The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically transmitted through one or more connections. The connections may occur on a physical level (e.g., wired or wireless). For example, the packets may be transmitted as signals (e.g., electrical, optical, etc) between the two systems through a variety of cables, routers, transmitters, receivers, and/or other interconnected hardware. In addition, the connections may occur on a logical level. For example, in order for the sending system and receiving system to communicate with one another, packets must properly reach the receiving system from the sending system. The receiving device must also recognize that the packets received are indeed meant for the receiving device and separate the packets from other incoming signals. Networking protocols dictate the rules for data representation, signaling, transfer, authentication, and error detection required to transmit information between the sending system and receiving system.

The Open Systems Interconnection Reference Model (OSI model) describes seven different layers that define requirements for communications between two computer systems. The OSI model was developed to enable interoperability between platforms offered by various vendors. Each layer of the OSI model performs services for the layer above and requests services from the layer below. In order from lowest to highest, the layers of the OSI model are: (i) the physical layer, which defines the electrical and physical specifications for devices, (ii) the data link layer, which specifies the transfer of data between network entities, (iii) the network layer, which describes the transmission of variable length data sequences from a source to a destination via one or more networks, (iv) the transport layer, which transfers data between end users, (v) the session layer, which opens, maintains, and closes connections between network devices, (vi) the presentation layer, which transforms data into a form usable by an application, and finally, (vii) the application layer, which allows a user to access the information transmitted over the network.

SUMMARY

In general, in one aspect, the invention relates to a method for routing a packet. The method includes receiving the packet from a first network into a network interface card (NIC), wherein the NIC is operatively connected to a host and wherein the host comprises a first virtual network stack and a second virtual network stack, sending the packet to a first virtual network stack, wherein the first virtual network stack comprises a first filter, a first network layer, and a first transport layer, wherein the first filter, the first network layer, and the first transport layer are isolated from the second virtual network stack, if the packet is permitted through the first filter in the first virtual network stack sending the packet to a first virtual NIC, and if the packet is not permitted through the first filter dropping the packet.

In general, in one aspect, the invention relates to a system for routing a packet. The system includes a first network interface card (NIC) operatively connected to a first network, a second NIC operatively connected to a second network, and a host. The host includes a first container operatively connected to the first physical NIC, a second container operatively connected to the second physical NIC, a first virtual network stack operatively connected to the first container, wherein the first virtual network stack comprises a first filter, a first network layer, and a first transport layer, and wherein the first filter, the first network layer, and the first transport layer are isolated from a second virtual network stack, the second virtual network stack operatively connected to the second container, wherein the second virtual network stack comprises a second filter, a second network layer, and a second transport layer, a first virtual NIC associated with the first virtual network stack, a second virtual NIC associated with the second virtual network stack, and a virtual switch connecting the first virtual NIC and the second virtual NIC.

The host is configured to receive the packet from the first network in the first NIC, send the packet to the first virtual network stack, if the packet is permitted through the first filter send the packet to the first virtual NIC. If the packet is not permitted through the first filter, drop the packet.

In general, in one aspect, the invention relates to a computer readable medium having computer readable program code embodied therein for causing a computer system to execute a method for routing a packet. The method includes receiving the packet from a first network in a network interface card (NIC), wherein the NIC is operatively connected to a host and wherein the host comprises a first virtual network stack and a second virtual network stack, sending the packet to a first virtual network stack, wherein the first virtual network stack comprises a first filter, a first network layer, and a first transport layer, wherein the first filter, the first network layer, and the first transport layer are isolated from the second virtual network stack. If the packet is permitted through the first filter on the first virtual network stack, sending the packet to a first virtual NIC. If the packet is not permitted through the first filter, dropping the packet.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to route network traffic using virtual network interface cards (NICs) and virtual network stacks. Virtual network stacks are connected to virtual NICs and/or physical NICs on a host. In one embodiment of the invention, a filter present in each virtual network stack restricts the bidirectional flow of packets as well as provides services such as network address translation (NAT), security policies, load balancing, etc. Further, in one embodiment of the invention, the virtual network stacks may regulate traffic (e.g., bandwidth) between networks. In addition, in one embodiment of the invention, each virtual network stack may filter network traffic to and from a container connected to the virtual network stack.

More specifically, embodiments of the invention provide a method and system to implement a demilitarized zone (DMZ) within a host using virtual network stacks and virtual NICs. In one or more embodiments of the invention, the virtual network stacks and virtual NICs are interposed between two networks in order to partition data flow between the networks.

In one embodiment of the invention, the virtual network stacks include functionality to monitor all traffic between the networks. In addition, containers connected to the virtual network stacks may provide additional DMZ-related services such as email, web server functionality, and domain name system (DNS) lookup. In one or more embodiments of the invention, virtual network stacks in the host are connected through their corresponding virtual NICs using a virtual switch. Further, virtual network stacks and their filters may be configured using a control container connected to the virtual switch. In one embodiment of the invention, an administrator may configure each virtual network stack by sending configuration packets from the control container to that virtual network stack. In such cases, the virtual network stacks may use the content of the configuration packets for configuration.

Figure 1:
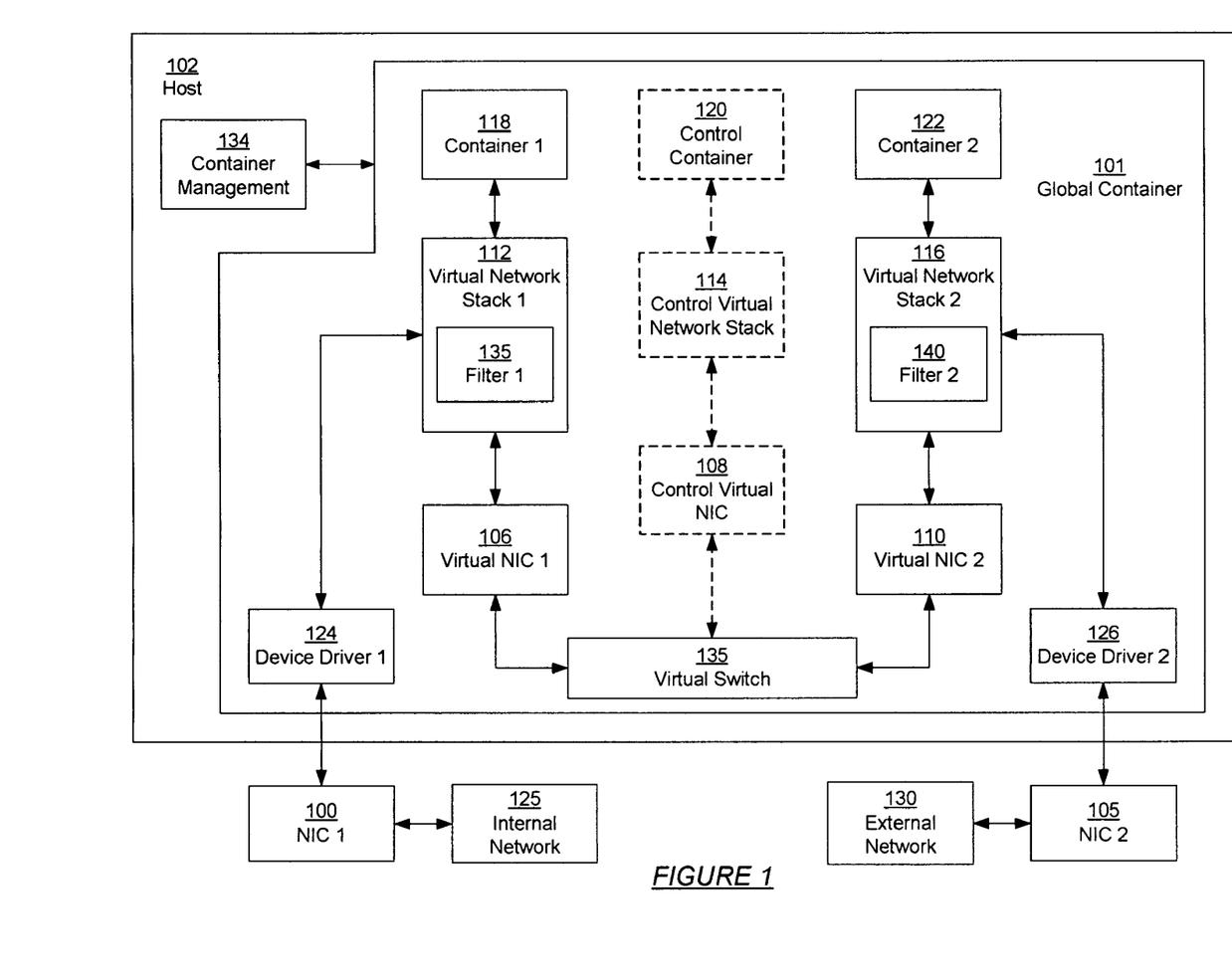
FIGS. 1-2 show schematic diagrams in accordance with one or more embodiments of the invention.

FIG. 1 shows a schematic diagram of a system in accordance with one or more embodiments of the invention. As shown in FIG. 1, the system includes a host (102) and multiple physical NICs (e.g., NIC 1 (100), NIC 2 (105)) connected to different networks (e.g., internal network (125), external network (130)). The system also includes device drivers for each NIC (e.g., device driver 1 (124), device driver 2 (126)) and multiple containers (e.g., global container (101), container 1 (118), control container (120), container 2 (122)), each of which is connected to a virtual network stack (e.g., virtual network stack 1 (112), control virtual network stack (114), virtual network stack 2 (116)). Each virtual network stack (e.g., virtual network stack 1 (112), control virtual network stack (114), virtual network stack 2 (116)) is further connected to a virtual NIC (e.g., virtual NIC 1 (106), control virtual NIC (108), virtual NIC 2 (110)). The host (102) also includes a container management module (134) that includes functionality to configure the aforementioned container and a virtual switch (135) configured to connect the aforementioned virtual NICs. Each of these components is described below.

In one embodiment of the invention, the NICs (e.g., NIC 1 (100), NIC 2 (105)) provide an interface between the host (102) and a network (e.g., internal network (125), external network (130)) (e.g., a local area network, a wide area network, a wireless network, etc.). More specifically, each of the NICs (e.g., NIC 1 (100), NIC 2 (105)) includes a network interface (NI) (i.e., the hardware on the NIC used to interface with the network). For example, the NI may correspond to an RJ-45 connector, a wireless antenna, etc. In one embodiment of the invention, the packets received by the NI are subsequently sent to other components on the NIC (e.g., NIC 1 (100), NIC 2 (105)) for processing.

In one or more embodiments of the invention, the host (102) may include one or more device drivers (e.g., device driver 1 (124), device driver 2 (126)) and one or more virtual NICs (e.g., virtual NIC 1 (106), control virtual NIC (108), virtual NIC 2 (110)). In one embodiment of the invention, the device drivers provide interfaces between the NICs (e.g., NIC 1 (100), NIC 2 (105)) and the host (102). More specifically, the device drivers (e.g., device driver 1 (124), device driver 2 (126)) expose the NICs (e.g., NIC 1 (100), NIC 2 (105)) to the host (102).

In one or more embodiments of the invention, each virtual NICs (e.g., virtual NIC 1 (106), control virtual NIC (108), virtual NIC 2 (110)) is operatively connected to a container (e.g., container 1 (118), control container (120), container 2 (122)) via a virtual network stack (e.g., virtual network stack 1 (112), control virtual network stack (114), virtual network stack 2 (116)). The virtual NICs (e.g., virtual NIC 1 (106), control virtual NIC (108), virtual NIC 2 (110)) provide an abstraction layer between the NICs (e.g., NIC 1 (100), NIC 2 (105)) and the containers (e.g., container 1 (118), control container (120), container 2 (122)) on the host (102).

More specifically, each virtual NIC (e.g., virtual NIC 1 (106), control virtual NIC (108), virtual NIC 2 (110)) operates like a NIC (e.g., NIC 1 (100), NIC 2 (105)). For example, in one or more embodiments of the invention, each virtual NIC (e.g., virtual NIC 1 (106), control virtual NIC (108), virtual NIC 2 (110)) is associated with one or more Internet Protocol (IP) addresses and associated with one or more Media Access Control (MAC) addresses. Each virtual NIC (e.g., virtual NIC 1 (106), control virtual NIC (108), virtual NIC 2 (110)) may also be associated with one or more ports and configured to handle one or more protocol types. As a result, containers (e.g., container 1 (118), control container (120), container 2 (122)) on the host (102) are unable to distinguish a virtual NIC (e.g., virtual NIC 1 (106), control virtual NIC (108), virtual NIC 2 (110)) from a physical NIC (e.g., NIC 1 (100), NIC 2 (105)).

In one or more embodiments of the invention, each virtual network stack (e.g., virtual network stack 1 (112), control virtual network stack (114), virtual network stack 2 (116)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack 1 (112), control virtual network stack (114), virtual network stack 2 (116)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack 1 (112), control virtual network stack (114), virtual network stack 2 (116)) implement an IP layer (not shown) and a TCP layer (not shown). The virtual network stack (e.g., virtual network stack 1 (112), control virtual network stack (114), virtual network stack 2 (116)) is described in further detail in FIG. 2.

In one or more embodiments of the invention, additional processing on packets within the virtual network stacks (e.g., virtual network stack 1 (112), control virtual network stack (114), virtual network stack 2 (116)) is performed by the filters (e.g., filter 1 (135), filter 2 (140)). In one embodiment of the invention, the filters (e.g., filter 1 (135), filter 2 (140)) implement control mechanisms, such as network address translation (NAT), a security policy, a firewall (stateful or stateless), a load balancer, etc. In one or more embodiments of the invention, these control mechanisms are implemented using utilities such as IPsec, IPFilter, and/or iptables.

In one or more embodiments of the invention, a demilitarized zone (DMZ) is implemented using the filters (e.g., filter 1 (135), filter 2 (140)) on one or more virtual network stacks (e.g., virtual network stack 1 (112), control virtual network stack (114), virtual network stack 2 (116)). A DMZ acts as a buffer between two (or more) networks (e.g., internal network (125), external network (130)). In one or more embodiments of the invention, an internal network (125) corresponds to a network that is privately administered and set up. For example, an internal network (125) may correspond to an organization's Local Area Network (LAN). In addition, hosts within the internal network (125) may be allowed to access utilities and data and communicate directly with one another, whereas hosts outside of the internal network (125) may not. In one or more embodiments of the invention, a host outside of the internal network (125) may establish a Virtual Private Network (VPN) connection in order to access restricted utilities and/or data within the internal network (125). In one or more embodiments of the invention, the filters (e.g., filter 1 (135), filter 2 (140)) implement a VPN between the external network (130) and the internal network (125).

In one embodiment of the invention, the external network (130) refers to a network that is not privately administered and controlled. For example, the external network (130) may correspond to the Internet. In one or more embodiments of the invention, the internal network (125) is connected to the external network (130) through the use of an Internet Service Provider (ISP). Those skilled in the art will appreciate that while FIG. 1 includes an Internal Network and an External Network, the invention may be implemented using any combination of networks.

In one or more embodiments of the invention, the DMZ may be configured to restrict the flow of traffic between the two networks (e.g., internal network (125), external network (130)). For example, the DMZ may permit connections between the internal network (125) and the DMZ and the external network (130) and the DMZ, but not connections directly between the external network (130) to the internal network (125). Alternatively, the DMZ may permit certain types of traffic between the external network (130) and the internal network (125). For example, packets may be permitted and/or dropped based on source IP address or port, destination IP address or port, source domain name, transport protocol, packet payload, VPN authentication, and/or other characteristics of the network traffic received by the DMZ.

In one or more embodiments of the invention, the virtual network stacks (e.g., virtual network stack 1 (112), control virtual network stack (114), virtual network stack 2 (116)) are connected to one another via their virtual NICs (e.g., virtual NIC 1 (106), control virtual NIC (108), virtual NIC 2 (110)) and a virtual switch (135). In one or more embodiments of the invention, the virtual switch (135) functions as a software equivalent of a network switch. In other words, the virtual switch (135) performs transparent bridging of network segments (i.e., virtual NICs) within the host (102). For example, virtual network stack 1 (112) can transmit and receive packets to virtual network stack 2 (116) by using virtual NIC 1 (106), the virtual switch (135), and virtual NIC 2 (110).

In one or more embodiments of the invention, all virtual NICs (e.g., virtual NIC 1 (106), control virtual NIC (108), virtual NIC 2 (110)) connected to the virtual switch (135) are registered in the virtual switch's address table (not shown). In one or more embodiments of the invention, each virtual NIC (e.g., virtual NIC 1 (106), control virtual NIC (108), virtual NIC 2 (110)) corresponds to an entry in the address table. Each entry in the address table includes a MAC address of the virtual NIC (e.g., virtual NIC 1 (106), control virtual NIC (108), virtual NIC 2 (110)) corresponding to the entry, as well as a pointer to the virtual NIC. The virtual switch (135) routes packets to their destinations using this address table. When a packet is received by the virtual switch (135), the destination address is checked against the entries in the address table. If a match is found, the packet is sent directly to the virtual NIC (e.g., virtual NIC 1 (106), control virtual NIC (108), virtual NIC 2 (110)) associated with the match, which then sends the packet to the corresponding virtual network stack (e.g., virtual network stack 1 (112), control virtual network stack (114), virtual network stack 2 (116)). If a match is not found, the packet is dropped. In one embodiment of the invention, the virtual switch corresponds to the virtual switch disclosed in the co-pending patent application entitled "Virtual Switch" (application Ser. No. 11/480,261) and assigned to assignee of the present application. The aforementioned patent application is hereby incorporated by reference.

In one or more embodiments of the invention, in order for a packet issued from one network (e.g., internal network (125), external network (130)) to be received by another network, the packet must pass through both filters (e.g., filter 1 (135), filter 2 (140)). Each filter (e.g., filter 1 (135), filter 2 (140)) may apply one or more control mechanisms to the packet to determine whether the packet may pass. For example, the filter (e.g., filter 1 (135), filter 2 (140)) may encrypt the packet, authenticate the packet, apply network address translation or port address translation to the packet, redirect the packet, etc. If the packet is blocked by either filter (e.g., filter 1 (135), filter 2 (140)), the packet is dropped.

Those skilled in the art will appreciate that a DMZ may be implemented using an arbitrary network topology. For example, any number of virtual network stacks (e.g., virtual network stack 1 (112), virtual network stack 2 (116)) connected by any number of virtual switches (110) in a variety of fashions may be constructed to implement the DMZ. In addition, the host may be connected to other NICs (e.g., NIC 1 (100), NIC 2 (105)), which may be connected to other networks (e.g., internal network (125), external network (130)) and associated with one or more additional virtual network stacks (e.g., virtual network stack 1 (112), virtual network stack 2 (116)).

As shown in FIG. 1, the host (102) includes a global container (101) and a number of non-global containers (e.g., container 1 (118), control container (120), container 2 (122)). The global container (101) corresponds to an isolated execution environment within the host (102). Further, each non-global container (e.g., container 1 (118), control container (120), container 2 (122)) corresponds to an isolated execution environment within the global container (101). All of the containers (global and non-global) share a common kernel, and as a result, execute the same operating system. While all of the containers share a common kernel, the non-global containers (e.g., container 1 (118), control container (120), container 2 (122)) are configured such that processes executing in a given non-global container are restricted to execute in the non-global container and have no access to resources not assigned to the non-global container. The isolated execution environments of each non-global container (e.g., container 1 (118), control container (120), container 2 (122)) as well as the global container (101) are managed by a container management component (134) executing on the host (102). The container management component (134) typically executes outside of the global container (101). An example of a container is a Solaris™ Container. (Solaris is a trademark of Sun Microsystems, Inc. of California, USA).

Each of the non-global containers (e.g., container 1 (118), control container (120), container 2 (122)) is configured to send and receive packets to and from the NICs (e.g., NIC 1 (100), NIC 2 (105)), as well as between one another through the virtual switch (135). The virtual network stacks (e.g., virtual network stack 1 (112), virtual network stack 2 (114), virtual network stack N (116)) connected to the non-global containers (e.g., container 1 (118), container 2 (120), container N (122)) process outgoing packets before transmitting the packets to other containers or hosts; the virtual network stacks also process incoming packets from other sources before sending the packets to the containers. In one or more embodiments of the invention, each non-global container (e.g., container 1 (118), control container (120), container 2 (122)) and the global container (101) are identified by a container ID, which uniquely identifies the container in the host (102).

In one or more embodiments of the invention, one or more containers (e.g., container 1 (118), container 2 (122)) within the DMZ may provide services to the internal network (125) and/or the external network (130). These services may include email, web server functionality, and DNS lookup. In addition, the containers (e.g., container 1 (118), container 2 (122)) may implement application-layer firewalls, such as Extensible Markup Language (XML) firewalls. Packets received from one network (e.g., internal network (125), external network (130)) may be bound for the other network, or for a container (e.g., container 1 (118), control container (120), container 2 (122)) in the host (102).

For example, packets from the external network (130) may request a web page from a container (e.g., container 1 (118), container 2 (122)) that acts as a web server. If those packets are allowed through the filter (e.g., filter 1 (135), filter 2 (140)) preceding the container (e.g., container 1 (118), container 2 (122)), they are processed and placed in the container. On the other hand, packets from the internal network (125) may request a web page from the external network (130), which may be connected to the Internet. In such cases, a packet must pass through one filter (e.g., filter 1 (135), filter 2 (140)) on one virtual network stack (e.g., virtual network stack 1 (112), virtual network stack 2 (116)), the virtual switch (135), and another filter (e.g., filter 1 (135), filter 2 (140)) on another virtual network stack (e.g., virtual network stack 1 (112), virtual network stack 2 (116)) before reaching the external network (130).

In one or more embodiments of the invention, the filters (e.g., filter 1 (135), filter 2 (140)) and their corresponding virtual network stacks (e.g., virtual network stack 1 (112), virtual network stack 2 (116)) are configured by the containers (e.g., container 1 (118), container 2 (122)) attached to the virtual network stacks. As a result, an administrator must be able to access the container (e.g., container 1 (118), container 2 (122)) in order to configure the container's virtual network stack (e.g., virtual network stack 1 (112), virtual network stack 2 (116)). An alternative solution, in accordance with one or more embodiments of the invention, involves creating a control container (120), along with a control virtual network stack (114) and a control virtual NIC (108). As shown in FIG. 1, the control container (120) is connected to the virtual switch (135) via the control virtual NIC (108). As a result, the control container is able to access the other virtual network stacks (e.g., virtual network stack 1 (112), virtual network stack 2 (116)) on the host (102).

The control container (120) is capable of configuring the virtual network stacks (e.g., virtual network stack 1 (112), virtual network stack 2 (116)) by sending configuration packets through the virtual switch (135) to the virtual network stacks. An administrator is thus able to configure all of the virtual network stacks (e.g., virtual network stack 1 (112), control virtual network stack (114), virtual network stack 2 (116)) on the host (102) by accessing one container (i.e., control container (120)). In addition, the administrator is not required to have access to all containers (e.g., container 1 (118), control container (120), container 2 (122)) in order to configure their virtual network stacks (e.g., virtual network stack 1 (112), virtual network stack 2 (116)) by using the control container (120). Those skilled in the art will appreciate that all virtual network stacks (e.g., virtual network stack 1 (112), control virtual network stack (114), virtual network stack 2 (116)) may be set to a particular configuration by the control container (120) by sending the same configuration packets to all virtual network stacks. Alternatively, the configuration of one or more virtual network stacks may be customized by sending specific configuration packets one or more virtual network stacks.

Figure 2:
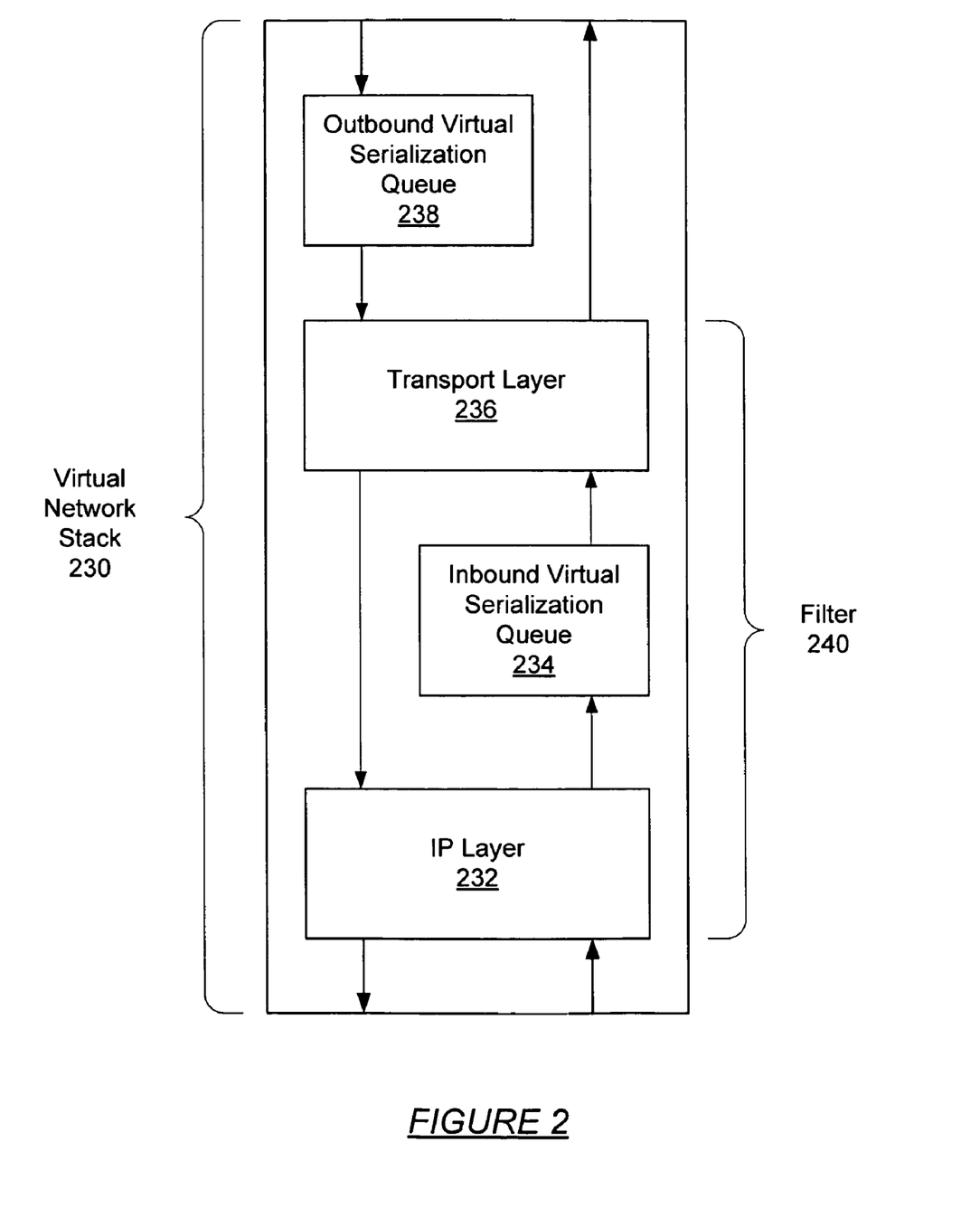

FIG. 2 shows a virtual network stack in accordance with one embodiment of the invention. In one embodiment of the invention, the virtual network stack (230) includes an Internet Protocol (IP) layer (232), an inbound virtual serialization queue (234), a transport layer (236), and an outbound virtual serialization queue (238). Each of the components is discussed below.

In one embodiment, the IP layer (232) is configured to receive packets from the virtual NIC associated with the virtual network stack (234). Further, the IP layer (232) is setup to receive packets from the transport layer (206). In one embodiment of the invention, the IP layer (232) is configured to perform IP level processing for both inbound and outbound packets. In one embodiment of the invention, the IP layer (232) is associated with a hardware (e.g., MAC) address to IP address mapping.

Continuing with the discussion of FIG. 2, the inbound virtual serialization queue (234) is configured to receive packets from the IP layer (232). The inbound virtual serialization queue (234) corresponds to a queue data structure which queues packets received from the IP layer (232) prior to the packets being processed by the transport layer (236). In one embodiment of the invention, the inbound virtual serialization queue (234) may be used to control the number of packets being received by the container associated with the virtual network stack (234). The inbound virtual serialization queue (234) may control the bandwidth by limiting the number of packets in the virtual serialization queue (234) and preventing additional packets from entering the virtual network stack (230) until the inbound virtual serialization queue (234) has less than a threshold number of packets. In one embodiment of the invention, the transport layer (236) is configured to process inbound and outbound packets in accordance with the Transmission Control Protocol (TCP) and/or User Datagram Protocol (UDP).

In one or more embodiments of the invention, the outbound virtual serialization queue (238) is a queue data structure for receiving packets from the container with which the virtual network stack (234) is associated. Further, the outbound virtual serialization queue (238) stores the packets prior to sending the received packets to the transport layer (236). In one embodiment of the invention, the outbound virtual serialization queue (238) is also able to control the flow of packets from the container associated with the virtual network stack (234) to the virtual network stack (234). In one embodiment of the invention, the outbound virtual serialization queue (238) (or a related process) may block the container from sending packets to the outbound virtual serialization queue (238) if the container attempts to issue packets at a higher rate than the outbound bandwidth allocated to the container. Further, the outbound virtual serialization queue (238) (or a related process) is configured to notify the container when it is no longer blocked from issuing packets to the virtual network stack (234).

In one or more embodiments of the invention, the inbound virtual serialization queue (234) and outbound virtual serialization queue (238) enforce the manner in which packets are processed. Specifically, the inbound virtual serialization queue (234) and outbound virtual serialization queue (238) may be configured to enforce the packet processing requirements imposed by the transport layer (236). For example, TCP requires serial processing of packets. Thus, the inbound virtual serialization queue (234) and outbound virtual serialization queue (238) may require all threads accessing the inbound virtual serialization queue (234) and outbound virtual serialization queue (238) to conform to a mutual exclusion policy. In one embodiment of the invention, the mutual exclusion policy may restrict access to the virtual serialization queue to one thread at a time. Thus, if two threads are attempting to access a given virtual serialization queue, one thread must wait until the other thread has finished accessing the virtual serialization queue.

Alternatively, if the transport layer (236) only supports UDP, then the inbound virtual serialization queue (234) and outbound virtual serialization queue (238) may allow concurrent access by multiple threads. In one embodiment of the invention, if the transport layer (236) is configured to process both TCP and UDP packets, then the inbound virtual serialization queue (234) and outbound virtual serialization queue (238) are set to conform to the more stringent standard (e.g., TCP if the transport layer supports both TCP and UDP).

As shown in FIG. 2, the filter (240) of FIG. 1 is implemented in both the transport layer (236) and the IP layer (232). As a result, the filter (240) may affect protocols in both the transport layer (236) and the IP layer (232). For example, the filter (240) may include a NAT mechanism, which is implemented in the IP layer (232). The filter (240) may also use Secure Sockets Layer (SSL), which is implemented in the transport layer (236). As stated above, the filter (240) may include control mechanisms such as NAT, a security policy, a load balancer, one or more firewalls, etc. In addition, the filter (240) may block or permit packets from entering the virtual network stack (230) based on source or destination address or port, transport protocol, packet payload, authentication, etc.

Figure 3:
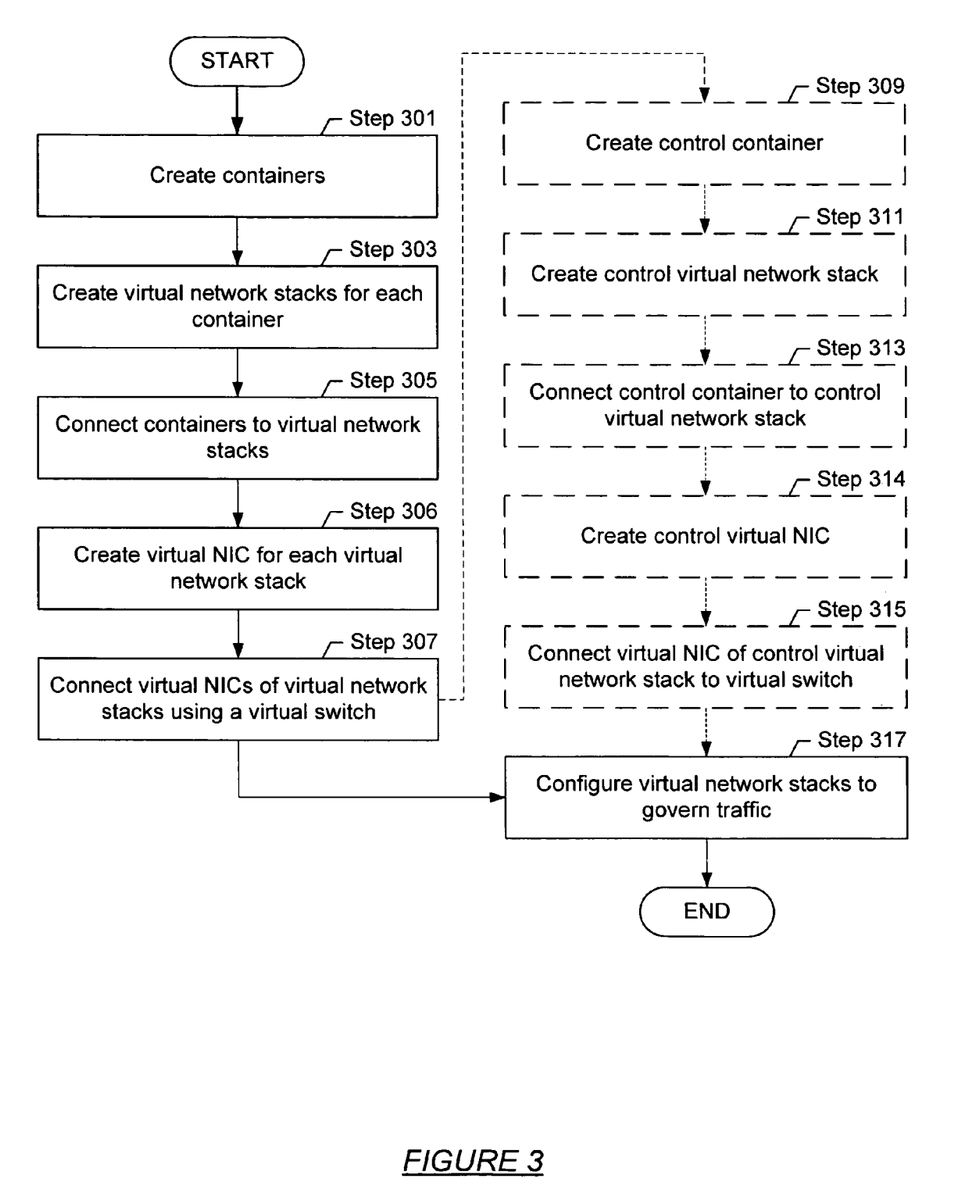
FIGS. 3-5 show flow diagrams in accordance with one or more embodiments of the invention.

FIG. 3 shows a flow diagram of a DMZ setup in accordance with one or more embodiments of the invention. In one embodiment of the invention, one or more of the steps described below may be omitted, repeated, and/or performed in a different order. Accordingly, the specific arrangement of steps shown in FIG. 3 should not be construed as limiting the scope of the invention.

Initially, containers for the DMZ are created (Step 301). As stated above, the containers may provide services to the internal and/or external network, such as email, web, and DNS lookup. In addition, a container may be created for each network connected to the DMZ. As mentioned previously, an arbitrary number of containers may be created with a variety of mappings to services and networks.

For each container, a virtual network stack is created (Step 303). Next, the virtual network stacks are connected to the corresponding containers (Step 305), and a virtual NIC is created for each virtual network stack (Step 306). Because each virtual NIC functions as a physical NIC, the virtual NICs are created with their own IP address and, optionally, their own MAC address. The virtual network stacks are subsequently linked to one another by connecting the virtual NICs with a virtual switch (Step 307). As described in FIG. 1, the virtual switch includes an address table of the virtual NICs and their MAC, if present, and/or IP addresses. As each virtual NIC is connected to the virtual switch, an entry corresponding to the virtual NIC is added to the virtual switch's address table, allowing the virtual switch to subsequently identify the virtual NIC based on IP or MAC address and send packets directly to the virtual NIC.

At this stage, the process may proceed to optional steps 309-315 or to step 317. If the DMZ includes a control container, the control container is created (Step 309). The control container allows an administrator to configure all virtual network stacks in the DMZ by sending configuration packets to the virtual network stacks. A control virtual network stack is then created (Step 311) and connected to the control container (Step 313) so that the control container may send configuration packets to other virtual network stacks on the host. A control virtual NIC is created (Step 314) for the control virtual network stack, and the control container is subsequently linked to the virtual switch via the control virtual NIC (Step 315), allowing the control container to send packets directly to other virtual network stacks on the host.

Finally, the virtual network stacks in the DMZ are configured to govern network traffic (Step 317). If a control container is created, the virtual network stacks are configured by sending configuration packets from the control container to each virtual network stack using the virtual switch. The virtual switch receives packets addressed for each virtual NIC, looks up the matching entry in the table, and sends the packets directly to the destination virtual NIC. Otherwise, if a matching entry is not found (e.g., if the virtual NIC does not exist), the packets are dropped. As discussed above, the virtual network stacks may be configured individually by the control container, or they may be configured all at once by broadcasting the same configuration packets to all virtual NICs connected to the virtual switch. Alternatively, a subset of the virtual network stacks may be identically configured using multicast groups and/or packets. In addition, configuration packets may be multicast to specific virtual NICs via the virtual switch so that those virtual NICs, and not others, are configured simultaneously.

If a control container is not part of the DMZ, each virtual network stack is configured independently using its associated container. An administrator must be able to access each container and run the configuration on each virtual network stack, regardless of the similarities in configurations between virtual network stacks.

Figure 4:
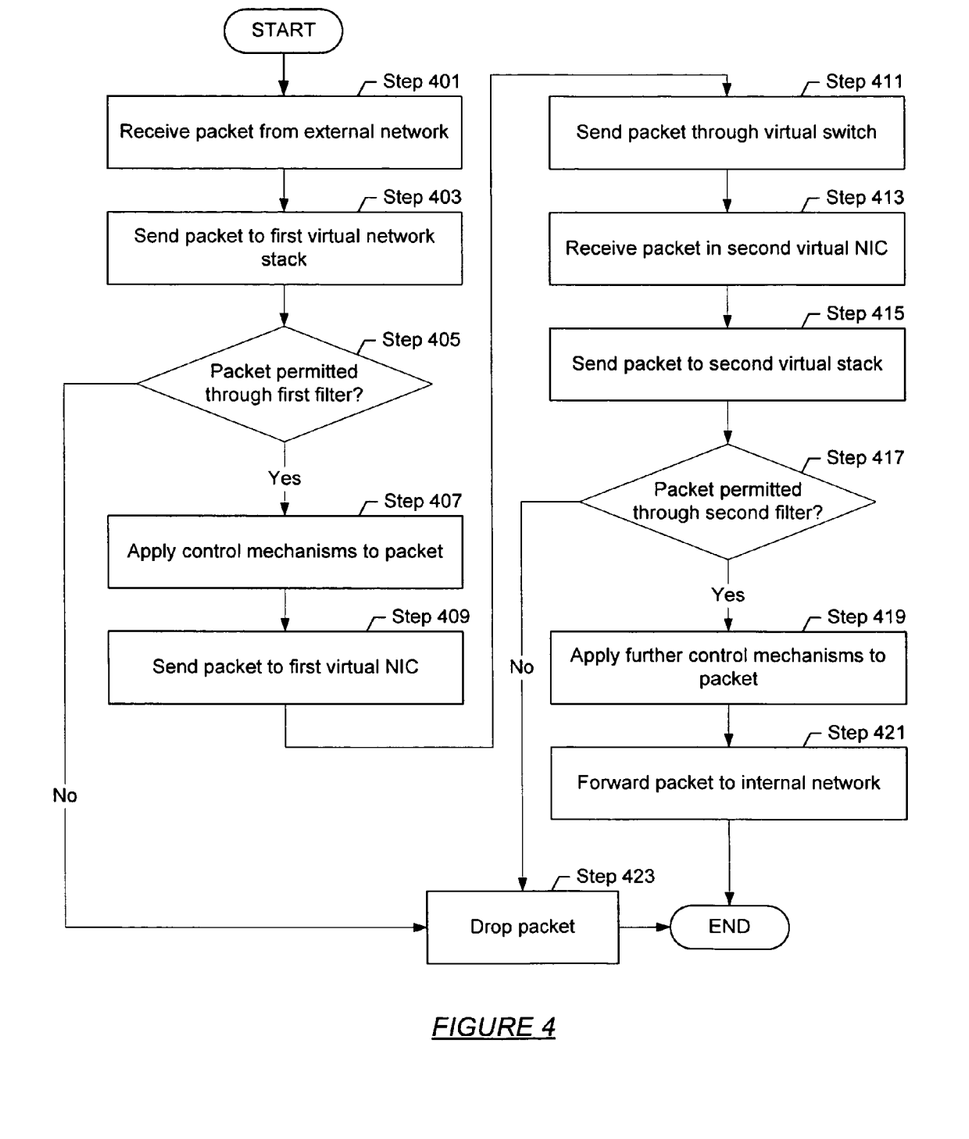

FIG. 4 shows a flow diagram for processing a packet in accordance with one or more embodiments of the invention. In one embodiment of the invention, one or more of the steps described below may be omitted, repeated, and/or performed in a different order. Accordingly, the specific arrangement of steps shown in FIG. 4 should not be construed as limiting the scope of the invention.

Initially, the packet is received from the external network via a physical NIC (Step 401). Alternatively, the packet may be received from the internal network or from another network connected to the DMZ. Those skilled in the art will appreciate that the DMZ may process packets differently based on source and destination networks, IP addresses, or ports, transport protocols, time to live (TTL) values, domain names of the source, destination service (e.g., HyperText Transfer Protocol (HTTP) or File Transfer Protocol (FTP)), based on the content of the packet, etc.

Once the packet is received, the packet is sent to the virtual network stack corresponding to the physical NIC (Step 403). At the first virtual network stack, a determination is made about whether the packet is allowed through the virtual network stack's filter (Step 405). As stated above, the packet may be allowed or blocked based on a variety of network configuration details. If the packet is blocked, the packet is dropped (Step 423) and does not reach its destination.

Otherwise, control mechanisms are applied to the packet (Step 407) by the virtual network stack's filter. These control mechanisms may include, but are not limited to, packet encryption, packet authentication, NAT, or any other processes that change the packet before placing the packet back into the network flow.

From the virtual network stack, the packet is sent to the virtual NIC (Step 409) associated with the virtual network stack. The virtual NIC then sends the packet to the virtual switch (Step 411), where the packet is sent to the virtual NIC corresponding to the second virtual network stack in the DMZ (Step 413). In one or more embodiments of the invention, the first virtual network stack changes the header in the packet so that the virtual switch knows to send the packet to the second virtual network stack. Alternatively, the virtual switch is programmed to automatically send all packets received from the first virtual network stack to the second virtual network stack. Those skilled in the art will appreciate that various network configurations exist for sending the packet from one virtual network stack to another, and that the invention may use any of these network configurations.

Once the packet is received in the second virtual NIC, the packet is sent to the second virtual network stack (Step 415), where a determination is made about whether the packet is permitted through the second filter (Step 417). If not, the packet is dropped (Step 423). Otherwise, another set of control mechanisms is applied to the packet by the filter of the second virtual network stack (Step 419). For example, the filter may apply another encryption algorithm or address translation utility to the packet before sending the packet to the internal network (Step 421). As stated above, each virtual network stack may apply different control mechanisms to the packet based on the packet's source, destination, transport protocol, payload, etc. In addition, any number of virtual network stacks, filters, and virtual switches arranged in multiple ways may make up the DMZ. A packet must be allowed through all of the filters the packet is sent to in order to be allowed into the second network.

Figure 5:
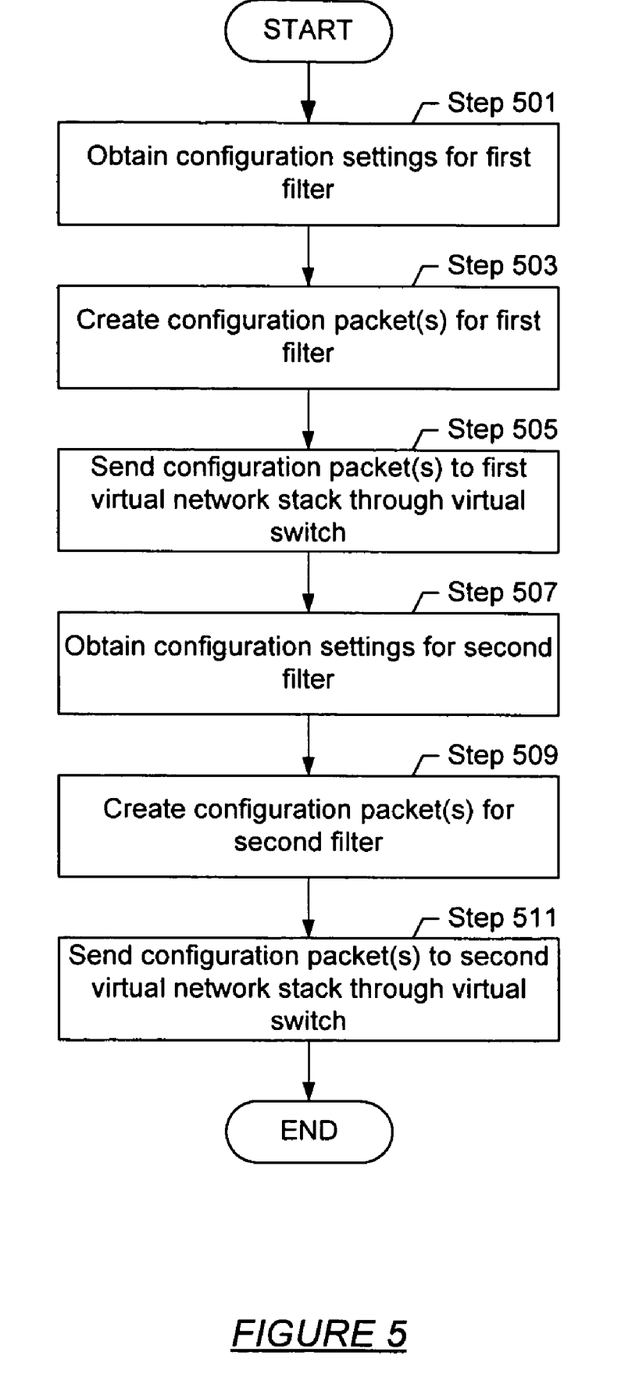

FIG. 5 shows a flow diagram of a DMZ configuration in accordance with one or more embodiments of the invention. In one embodiment of the invention, one or more of the steps described below may be omitted, repeated, and/or performed in a different order. Accordingly, the specific arrangement of steps shown in FIG. 5 should not be construed as limiting the scope of the invention.

Specifically, FIG. 5 shows the use of a control container to configure the virtual network stack(s) in the DMZ. Initially, configuration settings for the first filter are obtained (Step 501). These configuration settings may be input manually by an administrator, determined by an application (user-level or kernel level) running on the host, or any combination thereof. For example, an administrator may select a "security level" for the DMZ based on the applications and data present in the external network, the DMZ, and the internal network. The security level would then dictate how each virtual network stack is configured such that the appropriate control mechanisms are applied to traffic in either direction.

Upon receipt of the configuration settings for the first filter, the control container creates one or more configuration packets to configure the first filter (Step 503). In one or more embodiments of the invention, the configuration packet(s) include the configuration settings and are addressed to the first virtual network stack. The configuration packet(s) are then sent through the virtual switch to the first virtual network stack (Step 505), where the configuration settings are implemented in the first filter. Next, configuration settings are obtained for the second filter (Step 507). Those skilled in the art will appreciate that different methods may be used for obtaining configuration settings for each filter. For example, an administrator may choose to use a prepackaged set of configuration settings for the first filter (e.g., setting the security policy for the first filter), but may then choose to customize the configuration settings for the second filter.

Once the configuration settings have been determined for the second filter, the control container creates one or more configuration packets to configure the second filter (Step 509). The configuration packet(s) are then sent through the virtual switch to the second virtual network stack (Step 511), where the configuration settings are implemented in the second filter. The virtual network stacks may then optionally confirm that the configuration settings have been implemented by sending one or more packets back to the control container acknowledging the receipt and processing of the configuration packets.

Figure 6:
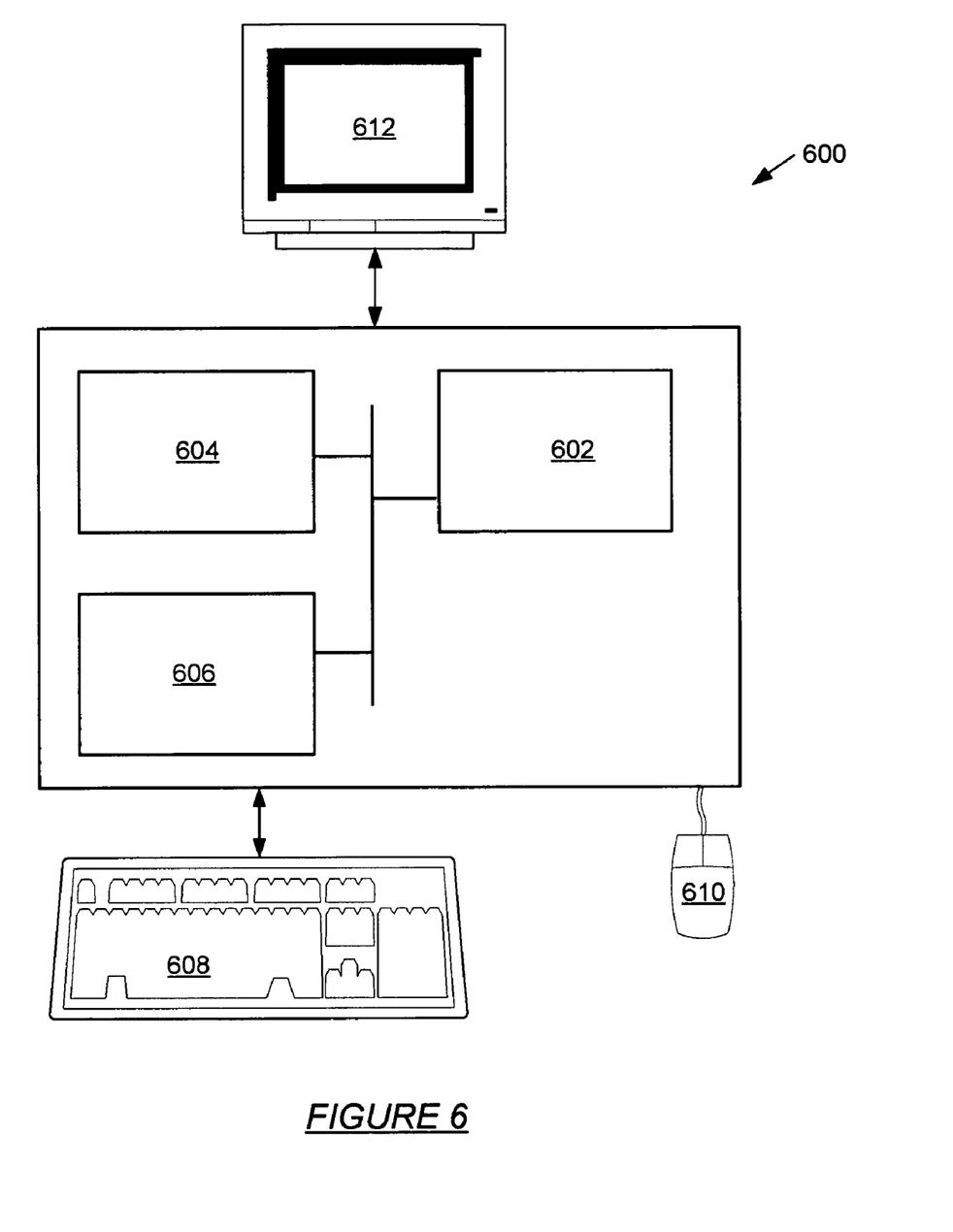
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., virtual NIC, virtual switch, virtual network stack, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing a packet, comprising:
receiving the packet from a first network into a network interface card (NIC), wherein the NIC is operatively connected to a host and wherein the host comprises a global container comprising a first virtual network stack and a second virtual network stack, wherein the first virtual network stack and the second virtual network stack share a common kernel and execute within a common operating system;
sending the packet to the first virtual network stack, wherein the first virtual network stack comprises a first filter, a first network layer, and a first transport layer, wherein the first filter, the first network layer, and the first transport layer are isolated from the second virtual network stack;

if the packet is permitted through the first filter in the first virtual network stack:
 sending the packet to a first virtual NIC, wherein the first virtual NIC is within the global container, shares the common kernel, and executes within the common operating system; and
if the packet is not permitted through the first filter:
 dropping the packet.

2. The method of claim 1, further comprising:
applying, by the first filter, a first control mechanism to the packet.

3. The method of claim 2, wherein the first control mechanism is one selected from the group consisting of: a firewall, a network address translation service, a security policy, and a load balancer.

4. The method of claim 1, further comprising:
if the packet is permitted through the first filter on the first virtual network stack:
 sending the packet to a second virtual NIC via a virtual switch;
 sending the packet to a second virtual network stack, wherein the second virtual network stack comprises a second filter, a second network layer, and a second transport layer;
if the packet is permitted through the second filter on the second virtual network stack:
 sending the packet to a second NIC;
 sending the packet to a second network; and
if the packet is not permitted through the second filter:
 dropping the packet.

5. The method of claim 4, further comprising:
applying, by the second filter, a second control mechanism to the packet.

6. The method of claim 4, wherein the first filter is configured by receiving a first configuration packet from a control container, wherein the first configuration packet is used to configure the first filter, wherein the second filter is configured by receiving a second configuration packet from the control container, and wherein the second configuration packet is used to configure the second filter.

7. The method of claim 1, wherein the first network comprises an internal network.

8. The method of claim 1, wherein the second network comprises an external network.

9. A system for routing a packet, comprising:
a first network interface card (NIC) operatively connected to a first network;
a second NIC operatively connected to a second network; and
a host, comprising a global container comprising:
 a first container operatively connected to the first physical NIC;
 a second container operatively connected to the second physical NIC;
 a first virtual network stack operatively connected to the first container, wherein the first virtual network stack comprises a first filter, a first network layer, and a first transport layer;
 a second virtual network stack operatively connected to the second container, wherein the second virtual network stack comprises a second filter, a second network layer, and a second transport layer, wherein the first virtual network stack and the second virtual network stack share a common kernel and execute within a common operating system, and wherein the first filter, the first network layer, and the first transport layer are isolated from the second virtual network stack;
 a first virtual NIC associated with the first virtual network stack, wherein the first virtual NIC shares the common kernel and executes within the common operating system;
 a second virtual NIC associated with the second virtual network stack; and
 a virtual switch connecting the first virtual NIC and the second virtual NIC,
wherein the host is configured to:
 receive the packet from the first network in the first NIC;
 send the packet to the first virtual network stack;
 if the packet is permitted through the first filter:
  send the packet to the first virtual NIC; and
 if the packet is not permitted through the first filter:
  drop the packet.

10. The system of claim 9, wherein the host is further configured to:
apply, using the first filter, a first control mechanism to the packet.

11. The system of claim 10, wherein the first control mechanism is one selected from the group consisting of: a firewall, a network address translation service, a security policy, and a load balancer.

12. The system of claim 9, wherein the host is further configured to:
send the packet to the second virtual NIC via the virtual switch;
send the packet to the second virtual network stack;
if the packet is permitted through the second filter:
 send the packet to the second NIC;
 send the packet to the second network; and
if the packet is not permitted through the second filter:
 drop the packet.

13. The system of claim 9, wherein the host further comprises:
a control container;
a control virtual network stack operatively connected to the control container; and
a control virtual NIC operatively connected to the virtual switch, wherein the control virtual NIC is associated with the control virtual network stack,
wherein the control container is used to configure the first filter and the second filter.

14. The system of claim 9, wherein the first network comprises an internal network.

15. The system of claim 9, wherein the second network comprises an external network.

16. A computer readable medium having computer readable program code embodied therein which, when executed by a processor, perform a method for routing a packet, the method comprising:
receiving the packet from a first network in a network interface card (NIC), wherein the NIC is operatively connected to a host and wherein the host comprises a global container comprising a first virtual network stack and a second virtual network stack, wherein the first virtual network stack and the second virtual network stack share a common kernel and execute within a common operating system;
sending the packet to a first virtual network stack, wherein the first virtual network stack comprises a first filter, a first network layer, and a first transport layer, wherein the first filter, the first network layer, and the first transport layer are isolated from the second virtual network stack;

if the packet is permitted through the first filter on the first virtual network stack:

sending the packet to a first virtual NIC, wherein the first virtual NIC is within the global container, shares the common kernel, and executes within the common operating system; and if the packet is not permitted through the first filter:

dropping the packet.

17. The computer readable medium of claim 16, the further comprising:

applying a first control mechanism to the packet using the first filter.

18. The computer readable medium of claim 17, wherein the first control mechanism is one selected from the group consisting of: a firewall, a network address translation service, a security policy, and a load balancer.

19. The computer readable medium of claim 16, the method further comprising:

if the packet is permitted through the first filter on the first virtual network stack:

sending the packet to a second virtual NIC via a virtual switch;

sending the packet to a second virtual network stack, wherein the second virtual network stack comprises a second filter, a second network layer, and a second transport layer;

if the packet is permitted through the second filter on the second virtual network stack:

sending the packet to a second NIC;

sending the packet to a second network; and if the packet is not permitted through the second filter:

dropping the packet.

20. The computer readable medium of claim 19, wherein the first filter is configured by receiving a first configuration packet from a control container, wherein the first configuration packet is used to configure the first filter, wherein the second filter is configured by receiving a second configuration packet from the control container, and wherein the second configuration packet is used to configure the second filter.

* * * * *